US008393803B2

(12) United States Patent
Hogue (10) Patent No.: US 8,393,803 B2
(45) Date of Patent: Mar. 12, 2013

(54) ADJUSTABLE OPTICAL FIBER CONNECTOR

(75) Inventor: Roger S. Hogue, St. Peter, MN (US)

(73) Assignee: Hogue Surgical, LLC, Maple Grove, MN (US)

( * ) Notice: Subject to any disclaimer, the term of this patent is extended or adjusted under 35 U.S.C. 154(b) by 317 days.

(21) Appl. No.: 12/917,882

(22) Filed: Nov. 2, 2010

(65) Prior Publication Data

US 2011/0103749 A1    May 5, 2011

Related U.S. Application Data

(60) Provisional application No. 61/257,893, filed on Nov. 4, 2009.

(51) Int. Cl.
 *G02B 6/36*        (2006.01)
(52) U.S. Cl. .................... 385/78; 385/76; 385/85
(58) Field of Classification Search .................. None
See application file for complete search history.

(56) References Cited

U.S. PATENT DOCUMENTS

| | | | |
|---|---|---|---|
| 3,922,064 A | 11/1975 | Clark et al. | |
| 3,969,015 A | 7/1976 | Le Noane | |
| 4,148,557 A | 4/1979 | Garvey | |
| 4,168,109 A * | 9/1979 | Dumire | 385/60 |
| 4,208,093 A * | 6/1980 | Borsuk | 385/85 |
| 4,318,586 A | 3/1982 | Coyne | |
| 4,354,731 A * | 10/1982 | Mouissie | 385/72 |
| 4,607,911 A * | 8/1986 | Rhodes | 385/86 |
| 4,964,685 A * | 10/1990 | Savitsky et al. | 385/58 |
| 5,050,956 A | 9/1991 | Carpenter et al. | |
| 5,187,768 A | 2/1993 | Ott et al. | |
| 5,239,602 A | 8/1993 | Hunsberger et al. | |
| 5,390,270 A | 2/1995 | Hanzawa et al. | |
| 5,436,994 A | 7/1995 | Ott et al. | |
| 5,671,310 A | 9/1997 | Lin et al. | |
| 5,734,770 A | 3/1998 | Carpenter et al. | |

(Continued)

FOREIGN PATENT DOCUMENTS

| | | |
|---|---|---|
| EP | 0835470 A1 | 4/1998 |
| EP | 1629312 A1 | 3/2006 |

(Continued)

OTHER PUBLICATIONS

International Search Report and Written Opinion issued in PCT/US2010/55091, mailed Jan. 4, 2011, 13 pages.

*Primary Examiner* — Mike Stahl
(74) *Attorney, Agent, or Firm* — Faegre Baker Daniels LLP (57) ABSTRACT

A connector for an optical fiber includes a first coupling element threadedly secured to a second coupling element such that the first coupling element and second coupling element define a lumen. A collet configured to receive a portion of the optical fiber is disposed in the lumen such that the collet holds the optical fiber in place with respect to the first and second coupling elements. An adjustable ferrule is threadedly secured to the proximal end of the second coupling element and is rotatable with respect to the second coupling element to translate a proximal end of the adjustable ferrule longitudinally with respect to a proximal end of the optical fiber. A connector element is secured to the proximal end of the second coupling element with the adjustable ferrule and is rotatable with respect to the second coupling element.

20 Claims, 5 Drawing Sheets

U.S. PATENT DOCUMENTS

| | | |
|---|---|---|
| 5,862,289 A | 1/1999 | Walter et al. |
| 5,943,460 A | 8/1999 | Mead et al. |
| 6,048,104 A | 4/2000 | Ohkubo et al. |
| 6,419,405 B1 | 7/2002 | Boscha |
| 6,848,834 B1 | 2/2005 | Roehrs et al. |
| 6,913,392 B2 | 7/2005 | Grzegorzewska et al. |
| 6,955,479 B2 | 10/2005 | Erdman et al. |
| 7,431,513 B2 | 10/2008 | Sezerman et al. |
| 7,736,301 B1 | 6/2010 | Webler et al. |
| 2012/0017438 A1 | 1/2012 | Hogue |

FOREIGN PATENT DOCUMENTS

JP  2005-128275 A  *  5/2005

* cited by examiner

ADJUSTABLE OPTICAL FIBER CONNECTOR

CROSS-REFERENCE TO RELATED APPLICATIONS

This application claims priority to Provisional Application No. 61/257,893, filed Nov. 4, 2009, which is incorporated herein by reference in its entirety.

TECHNICAL FIELD

The present invention relates to optical fiber connectors. More specifically, the present invention relates to a reusable optical fiber connector including an adjustable ferrule.

BACKGROUND

An optical fiber connector, which terminates the end of an optical fiber, facilitates connection and disconnection of the optical fiber to other coupling elements. For example, when connecting two optical fibers to each other, the connector mechanically couples and aligns the cores of fibers so that light can pass. As another example, when the connector is employed to mechanically and optically couple the optical fiber to an optical system, such as industrial, medical, surgical, laser, and telecommunications systems, the connector mechanically and optically connects the optical fiber to allow delivery of optical signals to the system. The optical fiber connector couples the fiber core adjacent to the receiving element to minimize the air space between the fiber core and the coupling element, thereby preventing signal loss.

SUMMARY

In one aspect, embodiments of the present invention relate to a connector for an optical fiber including a first coupling element having a proximal end and a distal end and a second coupling element having a proximal end and a distal end. The distal end of the second coupling element is threadedly secured to the proximal end of the first coupling element such that the first coupling element and second coupling element define a lumen. A collet configured to receive a portion of the optical fiber is disposed in the lumen such that the collet holds the optical fiber in place with respect to the first and second coupling elements. An adjustable ferrule is threadedly secured to the proximal end of the second coupling element and is rotatable with respect to the second coupling element to translate a proximal end of the adjustable ferrule longitudinally with respect to a proximal end of the optical fiber. A connector element is secured to the proximal end of the second coupling element with the adjustable ferrule and is rotatable with respect to the second coupling element.

In another aspect, embodiments of the present invention relate to a connector for coupling an optical fiber to an optical system. The connector includes a body including a first coupling element mechanically secured to a second coupling element. The body defines a lumen having proximal and distal ends of a first diameter. The lumen includes a middle section having a second diameter larger than the first diameter and frustoconical portions that transition from the middle section to the proximal and distal ends. A collet is disposed in the lumen and configured to receive a portion of the optical fiber. The collet includes tapered ends that are urged against the frustoconical portions of the lumen when the first and second coupling elements are secured together such that the tapered ends of the collet clamp against the optical fiber to hold the optical fiber in place with respect to the first and second coupling elements. An adjustable ferrule is threadedly secured to a proximal end of the body, and a connector element is secured to the proximal end of the body with the adjustable ferrule. The connector element is rotatable with respect to the body to mechanically secure the connector to the optical system.

In a further aspect, embodiments of the present invention relate to an optical fiber assembly including an optical fiber, a first coupling element including a proximal end and a distal end, and a second coupling element including a proximal end and a distal end. The distal end of the second coupling element is threadedly secured to the proximal end of the first coupling element such that the first coupling element and second coupling element define a lumen. A collet, which receives a buffered portion of the optical fiber, is disposed in the lumen such that the collet holds the optical fiber in place with respect to the first and second coupling elements. An adjustable ferrule, threadedly secured to the proximal end of the second coupling element, receives an unbuffered portion of the optical fiber. The adjustable ferrule is rotatable with respect to the second coupling element to translate a proximal end of the adjustable ferrule longitudinally with respect to a proximal end of the optical fiber.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
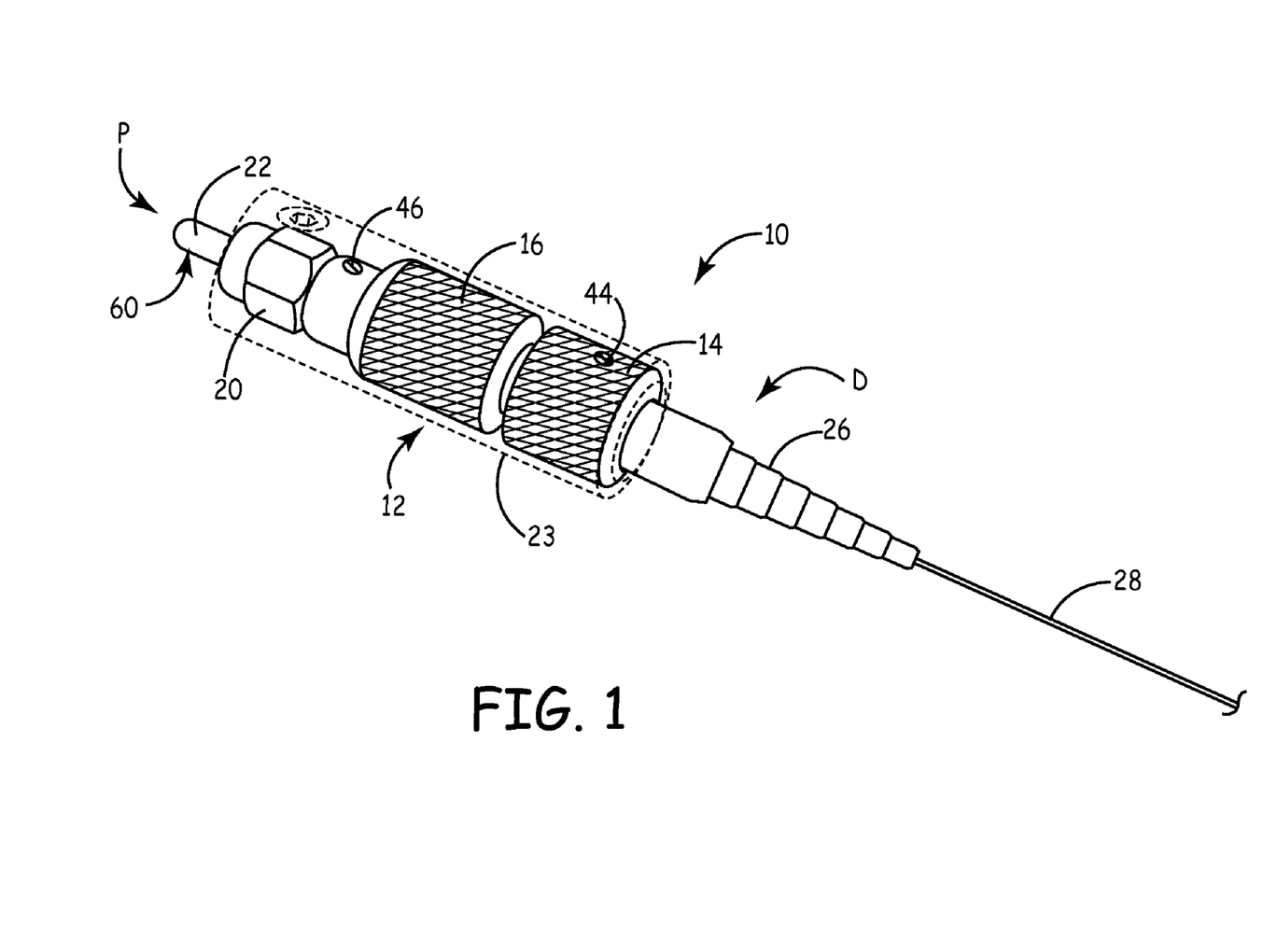
FIG. 1 is a perspective view of an embodiment of an optical fiber connector including an adjustable ferrule.
Figure 2:
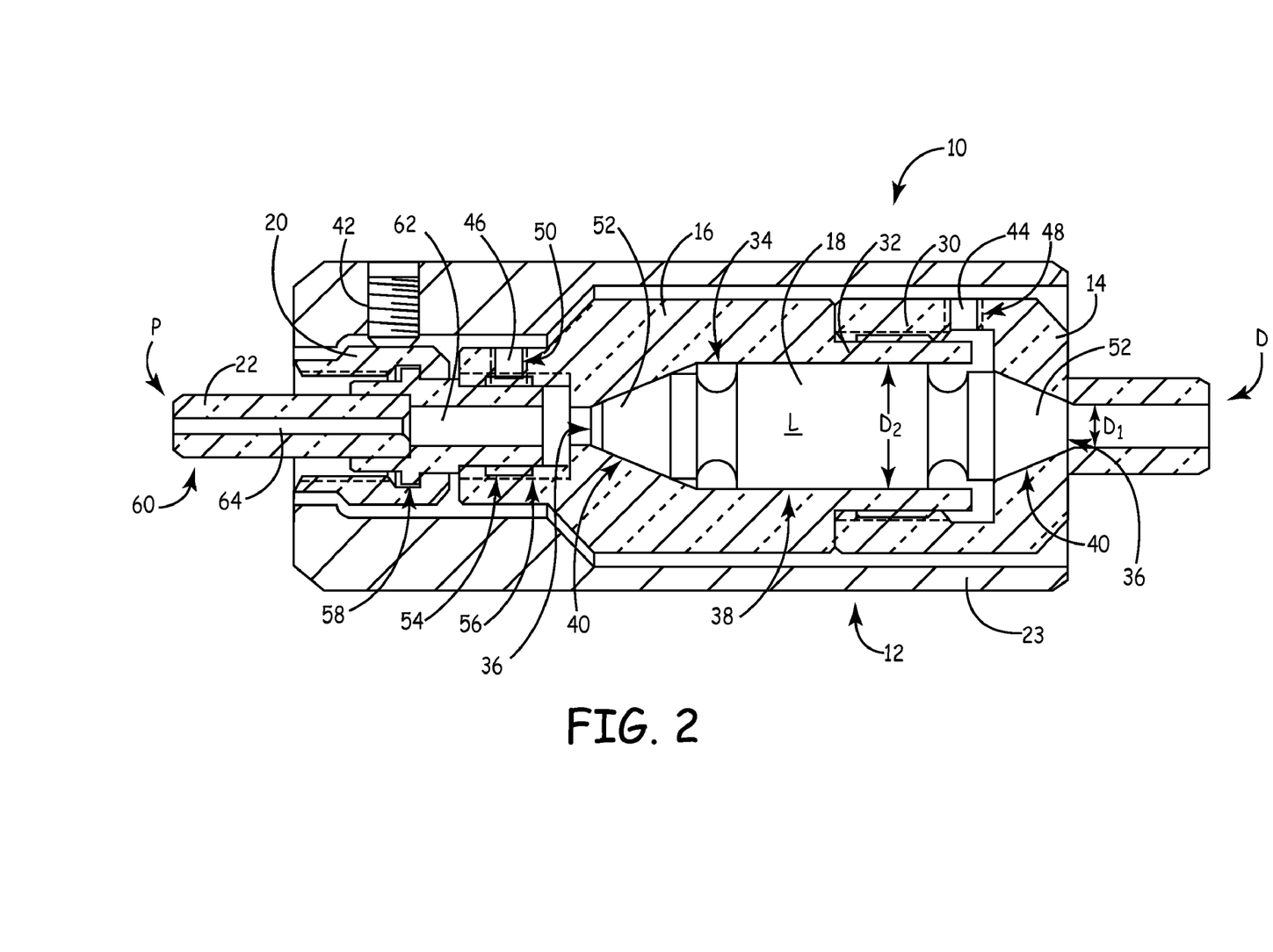
FIG. 2 is a cross-sectional view of the optical fiber connector shown in FIG. 1.
Figure 3:
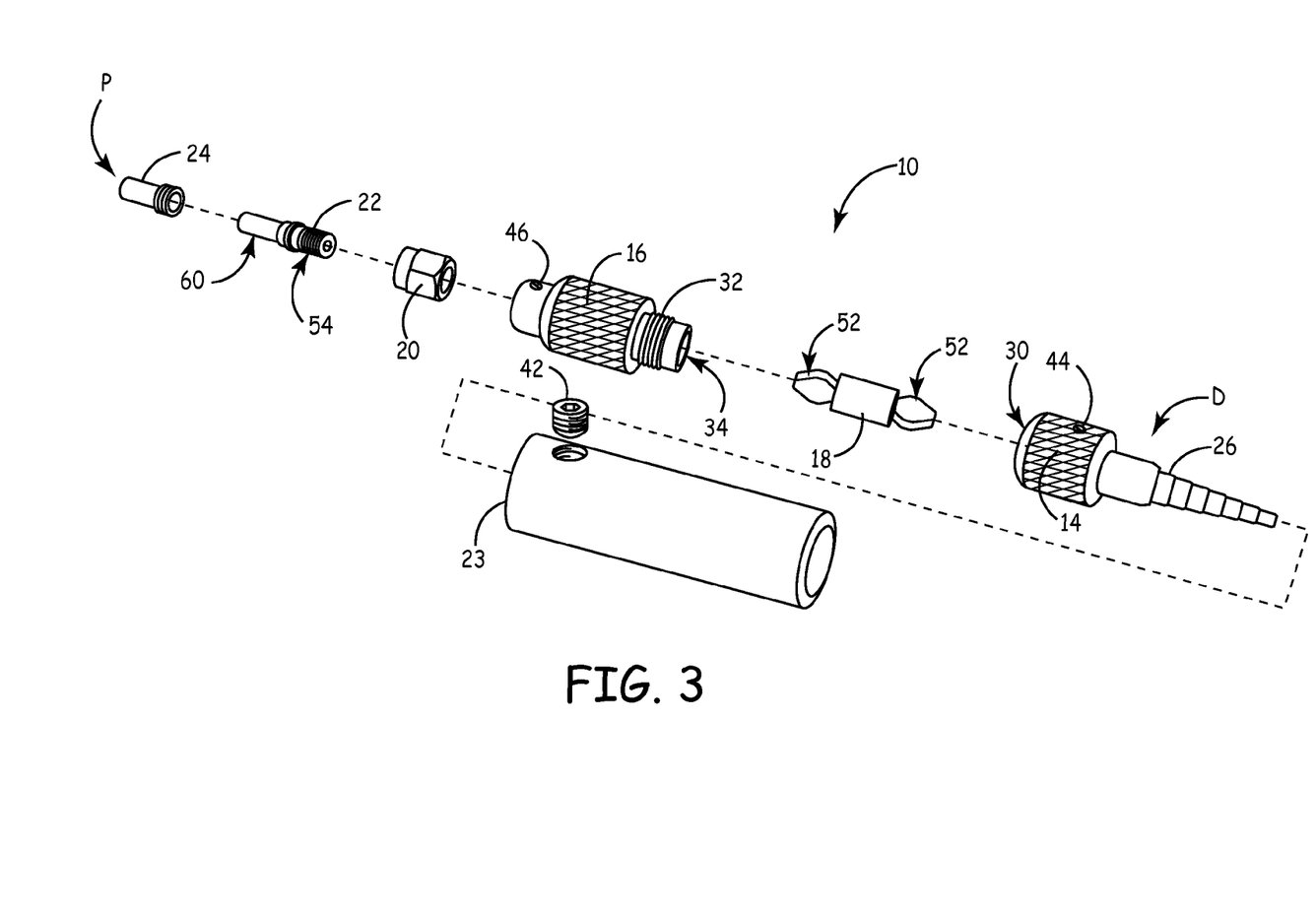
FIG. 3 is an exploded perspective view of the optical fiber connector shown in FIG. 1.

FIG. 1 is a perspective view, FIG. 2 is a cross-sectional view, and FIG. 3 is an exploded perspective view of an embodiment of an optical fiber connector 10 having a proximal end P and a distal end D. The optical fiber connector 10 includes a housing 12 including a first coupling element 14 and a second coupling element 16, a collet 18, a connector element 20, a ferrule 22, a collar 23, and a cap 24. In the embodiment shown, the optical fiber connector 10 also includes a strain relief sleeve 26 coupled to a distal end of the first coupling element 14. In FIG. 1, the optical fiber connector 10 is coupled to an optical fiber 28.

The first coupling element 14 includes a threaded bore 30 on its proximal end that is configured to engage a screw member 32 on a distal end of the second coupling element 16. While a screw member 32 is shown, the coupling elements 14, 16 may alternatively include other configurations to mechanically engage with each other. When engaged, the coupling elements 14, 16 define a lumen 34 that is sized and shaped to retain the collet 18. In some embodiments, the lumen 34 includes ends 36 having a first diameter $D_1$, a middle section 38 having a second diameter $D_2$ larger than the first diameter $D_1$, and frustoconical portions 40, which extend between the middle section 38 and ends 36 and transition between the first diameter $D_1$ and the second diameter $D_2$. In some embodiments, the first coupling element 14 and the second coupling element 16 are comprised of metal.

In some embodiments, the optical fiber connector 10 may include a collar 23 that covers one or both of the coupling elements 14, 16. The collar 23 is illustrate in phantom in FIG. 1. In embodiments in which the collar covers both coupling elements 14, 16, the collar 23 prevents manual or inadvertent decoupling of the coupling elements 14, 16 during use. The collar 23 may be secured to the connector element 20 with a set screw 42. In some embodiments, the collar 23 is disposed a distance from the coupling elements 14, 16 (e.g., 50 μm), such that rotation of the collar rotates the connector element 20 without rotating the underlying coupling elements 14, 16 with respect to each other. The collar 23 may be color-coded to allow a user to discern between different versions of the optical fiber connector 10 that, for example, accommodate different sized optical fibers 28. The collar 23 may also include labeling or other indicia to identify the manufacturer, the model number, the serial number, and so on. The labeling or indicia may be provided on the collar 23 by, for example, laser marking.

The optical fiber connector 10 may also include one or more set screws to secure or lock elements with respect to each other. For example, in the embodiment shown in FIGS. 1-3, a set screw 44 is provided near the distal end of the first coupling portion 14, and a set screw 46 is provided near the proximal end of the second coupling portion 16. The set screw 44 is received in a radially directed threaded bore 48 extending through the first coupling element 14. The set screw 44 is actuatable to engage with the second coupling element 16 to lock the second coupling element 16 longitudinally with respect to the first coupling element 14. The set screw 46 is received in a radially directed threaded bore 50 extending through the second coupling element 16. The set screw 46 is actuatable to engage with the adjustable ferrule 22 to lock the adjustable ferrule 22 longitudinally with respect to the second coupling element 16. While the optical fiber connector 10 is shown including two set screws 44, 46 in FIGS. 1-3, it will be appreciated that the optical fiber connector 10 can include more or fewer set screws to secure the components of the optical fiber 10 with respect to each other.

The collet 18 is disposed in the lumen 34 and is configured to receive the optical fiber 28. As the optical fiber 28 is fed through the optical fiber connector 10 from the distal end D, the optical fiber 28 extends through the strain relief sleeve 26, a central lumen L of the collet 18, and the adjustable ferrule 22. The collet 18 may be made of a polymeric material, such as polyaryletheretherketone (PEEK), polyethylene (PE), polytetrafluoroethylene (PTFE), high-density polyethylene (HDPE), fluorinated ethylene propylene (FEP), or other suitable medical grade polymers. The collet 18 includes tapered ends 52 that are urged against the frustoconical portions 40 of the lumen 34 when the first and second coupling elements 14, 16 are secured together. This causes the tapered ends 52 of the collet 18 to clamp against the optical fiber 28 to hold the optical fiber 28 in place with respect to the collet 18. The engagement of the frustoconical portions 40 with the tapered ends 52 holds the collet 18 in place with respect to the coupling elements 14, 16.

The connector element 20 is secured to the proximal end of the second coupling element 16 with the adjustable ferrule 22. That is, the adjustable ferrule 22 includes a threaded portion 54 that engages a threaded bore 56 at the proximal end of the second coupling element 16. A neck 58 on the proximal end of the threaded portion 54 holds the connector element 20 in place with respect to the second coupling element 16. When secured to the second coupling element 16, the connector element 20 may be configured to rotate with respect to the second coupling element 16. This allows the optical fiber connector 10 to be quickly and easily engaged to or disengaged from another connector or an optical system. Example optical systems to which the optical fiber connector 10 may be connected include, but are not limited to, industrial, medical, surgical, laser, and telecommunications systems.

In the embodiment shown, the connector element 20 is a threaded nut. In some embodiments, the connector element 20 and adjustable ferrule 22 are configured and dimensioned as an SMA 905 connector. In other embodiments, the connector element 20 and adjustable ferrule 22 are configured and dimensioned as other types of screw interface connectors including, but not limited to, SMA 906, FSMA, FC, ADT-UNI, and Avio. In alternative embodiments, the connector element 20 and adjustable ferrule 22 may be configured to snap the optical fiber connector 10 to another connector or an optical system, may be configured for push-pull engagement, or may be configured for other types of mechanical engagement. For example, in some embodiments, the connector element 20 and adjustable ferrule 22 are configured and dimensioned as connector types including, but not limited to, E-2000, EC, ESCON, F-3000, Fibergate, LC, LuxCis, MIC, MPO, MT, MT-RJ, MU, Opti-Jack, standard connector (SC), VF-45, or V-PIN.

The adjustable ferrule 22 includes the distal threaded portion 54 that is coupled to a proximal ferrule portion 60. In some embodiments, the ferrule portion 60 is comprised of a ceramic material, such as zirconia. In other embodiments, the ferrule portion 60 is comprised of a metal, such as stainless steel. The adjustable ferrule 22 includes a central lumen including a first portion 62 and a second portion 64. The first portion 62 has a larger diameter than the second portion 64. The first portion 62 is sized to receive the optical fiber 28 with the buffer layer, and the second portion 64 is sized to receive the optical fiber 28 with the buffer layer removed or stripped away along at least a portion of the optical fiber 28 in the second portion 64. In one exemplary implementation, about ⅛ of the optical fiber 28 in the second portion 64 is unbuffered. The second portion 64 may alternatively be sized to also receive the optical fiber with the buffer layer intact.

The adjustable ferrule 22 may additionally include an arrangement in the first portion 62 and/or second portion 64 of the central lumen that minimizes or prevents fluid or debris from entering the housing 12. For example, a sealing layer may be formed along at least a portion of the central lumen that supports the proximal end of the optical fiber 28 and prevents fluid and debris from infiltrating the housing through the proximal end P. The sealing layer may be arranged in the adjustable ferrule 22 to allow the sealing layer to be compressed to create a gasket or seal effect. In one exemplary implementation, the sealing layer is provided in a cylindrical recess formed in the central lumen. In some embodiments, the sealing layer is comprised of a flexible and pliable material, such as silicone. In alternative embodiments, the sealing layer is comprised of other materials, such as epoxy or wax. The sealing layer material may also be selected to allow the adjustable ferrule to be subjected to high temperatures.

One advantage of the optical fiber connector 10 is that the components of the optical fiber connector 10 are assembled without the use of epoxy or crimping, resulting in a non-permanent assembly. In addition, the adjustability of the adjustable ferrule 22 allows the distance between the optical fiber 28 to be set by the assembler of the optical fiber connector 10, as will be discussed in more detail in FIGS. 4A and 4B below.

Another advantage of the optical fiber connector 10 is the ability to reprocess the various components of the optical fiber connector 10 after each use. Due to this reusability, the life of the optical fiber 28 is increased. In some embodiments, the optical fiber connector 10 and/or optical fiber 28 are reprocessed in an assembled state using appropriate decontamination techniques. For example, in one exemplary decontamination process, the optical fiber 28 is decontaminated, the optical fiber 28 at the proximal end P is inspected, and the optical fiber 28 is again decontaminated before subjecting the optical fiber connector 10 and optical fiber 28 to a sterilization process (e.g., steam sterilization). In some embodiments, the mechanical coupling of the optical fiber 28 to the connector 10 allows the optical fiber 28 to be decoupled from the connector 10 and refurbished for reuse. That is, the optical fiber 28 may be removed from the connector 10, the proximal end of the optical fiber 28 cut and stripped, and the proximal end of the optical fiber 28 subsequently re-inserted into the connector 10 for polishing or cleaving. In addition, the collet 18 can be easily removed for refurbishing or replacement after a use by opening the housing 12. The remaining portions of the optical fiber connector 10, such as the housing 12, the connector 20, and the adjustable ferrule 22 (including the sealing layer), are comprised of materials that can be subjected to autoclaving, radiation, chemical treatment (e.g., ethylene oxide), or other suitable reprocessing techniques.

Figure 4A:
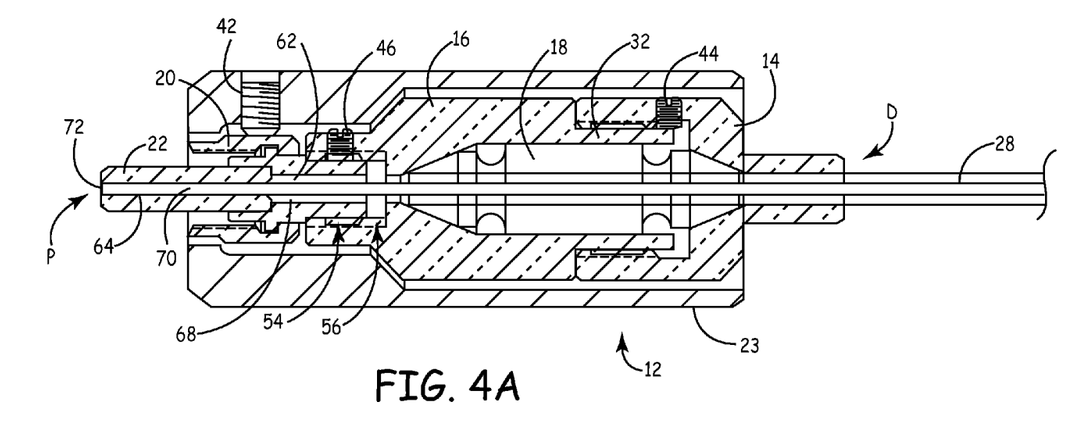
FIG. 4A is a cross-sectional view of the optical fiber connector shown in FIG. 1, showing a proximal end of a fiber optic cable disposed substantially flush with a proximal end of the ferrule.
Figure 4B:
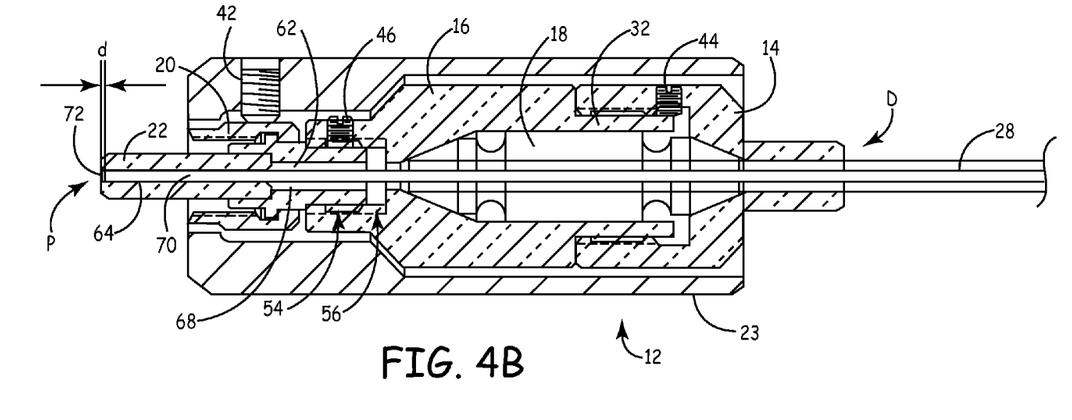
FIG. 4B is a cross-sectional view of the optical fiber connector shown in FIG. 1, showing the proximal end of the fiber optic cable recessed from the proximal end of the ferrule after adjustment.

FIGS. 4A and 4B illustrate the adjustability of the optical fiber 28 with respect to the proximal end of the adjustable ferrule 22. In FIG. 4A, the optical fiber 28 passes through the collet 18 in the housing 12 and into the adjustable ferrule 22. The portion of the optical fiber 28 in the first portion 62 of the adjustable ferrule 22 includes one or more buffer layer(s) 68 around the fiber core 70, and at least a portion of the optical fiber 28 in the second portion 64 of the adjustable ferrule 22 has the buffer layer(s) 68 stripped away, such that only the fiber core 70 is in the second portion 64. The optical fiber 28 is arranged such that the end face 72 of the fiber core 70 is substantially flush with the proximal end of the adjustable ferrule 22. The optical fiber 28 may then be held in place by tightening the coupling elements 14, 16 and engaging the set screw 44 with the second coupling element 16. The set screw 46 may also be engaged with the adjustable ferrule 22 to maintain the position of the adjustable ferrule 22. The end face 72 may then be polished or cleaved and examined to minimize insertion loss of the optical fiber 28 and reduce back reflection from the end face 72. To protect the end face 72 from damage and impurities until use, the cap 24 (FIG. 3) may be placed over the adjustable ferrule 22 and secured to the connector element 20 by engaging the outer threads on the cap 24 with the inner threads of the connector element 20.

After polishing or cleaving, the set screw 46 is disengaged from the adjustable ferrule 22, and the adjustable ferrule 22 is manipulated to recess the end face 72 from the proximal end of the adjustable ferrule 22. In particular, the adjustable ferrule 22 is rotated to disengage or unscrew the threaded portion 54 from the threaded bore 56. This causes the adjustable ferrule 22 to translate longitudinally in the proximal direction with respect to the optical fiber 28, thereby recessing the end face 72 from the proximal end P of optical fiber connector 10 by a distance d. Recessing the end face 72 minimizes damage to the end face 72 during use of the optical fiber 28. In some embodiments, the end face 72 is recessed from the proximal end P by less than 0.5 mm. When the end face 72 has been recessed the desired distance d, the set screw 46 may then be actuated to engage the adjustable ferrule 22 to ensure that the adjustable ferrule 22 does not move with respect to the optical fiber 28 during use. In alternative embodiments, the end face 72 may be positioned flush with the proximal end P or the end face 72 may protrude from the proximal end P, depending on the application of the optical fiber connector 10.

Figure 5A:
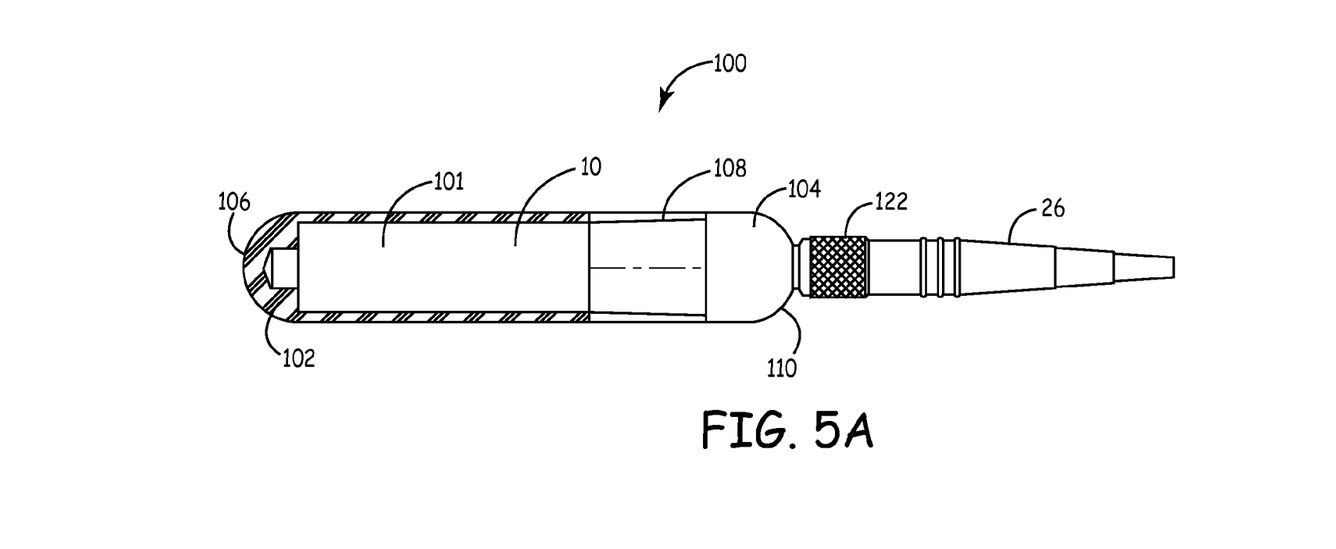
FIG. 5A is a partial cross-sectional view of a protective shell suitable for securing around the optical fiber connector.
Figure 5B:
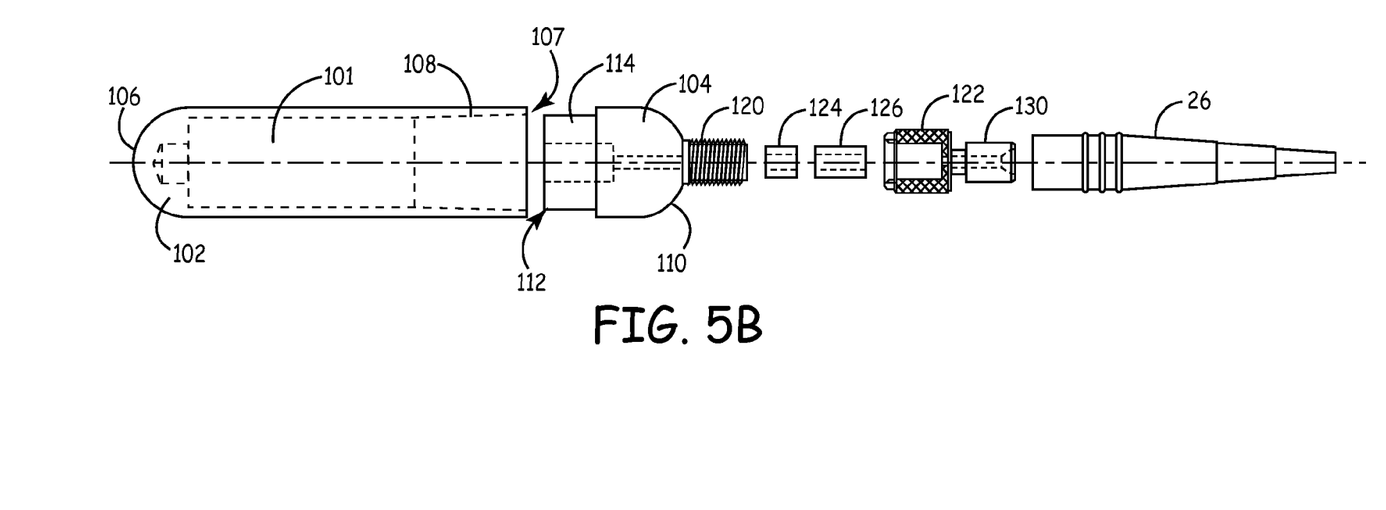
FIG. 5B is an exploded view of the protective shell shown in FIG. 5A.

FIG. 5A is a cross-sectional view and FIG. 5B of an embodiment of a protective shell 100 suitable for securing around the optical fiber connector 10. The protective shell 100 includes a cavity 101 that accommodates the optical fiber connector 10. The protective shell 100 may be used, for example, to keep the connector 10 clean and dry when the optical fiber connector 10 and optical fiber 28 are submerged in a solution for cleaning the optical fiber. In addition, the protective shell 100 may be secured around the optical fiber connector 10 during shipping and/or storage of the optical fiber connector 10 to protect the optical fiber connector 10 from damage and contamination.

The protective shell 100 includes a proximal portion 102 and a distal portion 104. The proximal portion 102 includes a convex proximal end 106 that is disposed a distance from the adjustable ferrule 22 (FIG. 1) when the protective shell 100 is assembled around the optical fiber connector 10. This protects the end face 72 of the fiber core 70 from and damage and debris during transport and storage, for example. The proximal portion 102 also includes a distal end 107 that is open to the cavity 101. In some embodiments, the cavity 101 includes a taper 108 that expands toward the distal end 107 of the proximal portion 102. In some embodiments, the proximal portion 102 is comprised of an autoclavable material, such as polyether ether ketone (PEEK), polyetherimide (e.g., ULTEM®), aluminum, stainless steel, or nickel-plated brass.

The distal portion 104 includes a convex distal end 110 and a proximal end 112 that includes a neck 114. The neck 114 is sized and shaped to be received by the open distal end 107 of the proximal portion 102 and secured therein. In some embodiments, the neck 114 is secured with respect to the open distal end 107 with friction (e.g., by causing the neck 114 to be urged against the taper 108). In other embodiments, the neck 114 and the cavity 101 at the distal end 107 of the proximal portion 102 include threads to threadedly secure the proximal portion 102 with respect to the distal portion 104. An autoclavable sealing structure (e.g., a high temperature o-ring) may be disposed between the proximal portion 102 and distal portion 104 to deal the interface between these two structures. In some embodiments, the distal portion 104 is permanently secured the distal end D of the connector 10. In other embodiments, the distal portion 104 is removably securable to the distal end D.

The distal portion 104 may further include a nipple 120 that extends from the distal end 108. The nipple 120 may be configured to couple to an adapter 122. In some embodiments, the nipple 120 is externally threaded to couple with an internally threaded adapter 122. In some embodiments, the adapter 122 is a Tuohy Borst type adapter. A sealing member 124 and a metal element 126 are secured between the nipple 120 and the adapter 122 when the protective shell 100 is assembled. The sealing member 124 is compressed by the metal element 126 when the adapter 122 is secured to the nipple 120, which seals the lumen of the connector 10 and prevents ingress of contaminants and liquids.

The adapter 122 may also include an attachment member 130 that provides an interface for securing the strain relief sleeve 26 to the distal end of the protective shell 100. In some embodiments, the strain relief sleeve 26 is permanently affixed to the attachment member 130. The optical fiber 28 may be threaded through the optical fiber connector 10 contained within the protective shell 100 and out of the protective shell 100 through the distal end of the strain relief sleeve 26.

In summary, embodiments of the present invention relate to a connector for an optical fiber including a first coupling element having a proximal end and a distal end and a second coupling element having a proximal end and a distal end. The distal end of the second coupling element is threadedly secured to the proximal end of the first coupling element such that the first coupling element and second coupling element define a lumen. A collet configured to receive a portion of the optical fiber is disposed in the lumen such that the collet holds the optical fiber in place with respect to the first and second coupling elements. An adjustable ferrule is threadedly secured to the proximal end of the second coupling element and is rotatable with respect to the second coupling element to translate a proximal end of the adjustable ferrule longitudinally with respect to a proximal end of the optical fiber. A connector element is secured to the proximal end of the second coupling element with the adjustable ferrule and is rotatable with respect to the second coupling element. The mechanical coupling of the optical fiber to the connector allows fiber to be refurbished for reuse in the connector assembly, thereby increasing the life of the optical fiber. The collet can also be easily removed for refurbishing or replacement after a use. Furthermore, the adjustable ferrule allows the proximal end of the optical fiber to be easily recessed from the proximal end of the ferrule to minimize damage of the optical fiber end face during transport and operation.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

I claim:

1. A connector for an optical fiber, the connector comprising:
    a first coupling element including a proximal end and a distal end;
    a second coupling element including a proximal end and a distal end, the distal end of the second coupling element threadedly secured to the proximal end of the first coupling element, wherein the first coupling element and second coupling element define a lumen;
    a collet configured to receive a portion of the optical fiber, the collet disposed in the lumen such that the collet holds the optical fiber in place with respect to the first and second coupling elements;
    an adjustable ferrule threadedly secured to the proximal end of the second coupling element and rotatable with respect to the second coupling element to translate a proximal end of the optical fiber longitudinally with respect to a proximal end of the adjustable ferrule; and
    a connector element secured to the proximal end of the second coupling element with the adjustable ferrule, wherein the connector element is rotatable with respect to the second coupling element.

2. The connector of claim 1, wherein the connector element defines a threaded annular cavity, and wherein the connector further comprises:
    a cap including an outer thread that is securable to the threaded annular cavity to cover the adjustable ferrule.

3. The connector of claim 1, and further comprising:
    a strain relief sleeve coupled to the distal end of the first coupling element.

4. The connector of claim 1, wherein the collet includes tapered ends, wherein the lumen is sized such that the tapered ends of the collet are urged against ends of lumen, and wherein the ends of the lumen are shaped such that the tapered ends of the collet are clamped against the optical fiber to hold the optical fiber in place with respect to the first and second coupling elements.

5. The connector of claim 1, and further comprising:
    a first set screw receivable in a radially directed threaded bore extending through the first coupling element and engageable with the second coupling element to lock the second coupling element longitudinally with respect to the first coupling element; and
    a second set screw receivable in a radially directed threaded bore extending through the second coupling element and engageable with the adjustable ferrule to lock the adjustable ferrule longitudinally with respect to the second coupling element.

6. The connector of claim 1, wherein the connector element comprises a threaded coupling nut.

7. The connector of claim 1, wherein the adjustable ferrule includes a central lumen having a cylindrical recess that supports a sealing layer.

8. The connector of claim 1, and further comprising:
    a collar disposed around the first coupling element and second coupling element, the collar secured to the connector element and spaced from the first and second coupling elements such that rotation of the collar rotates the connector element with respect to the second coupling element.

9. A connector for coupling an optical fiber to an optical system, the connector comprising:
    a body including a first coupling element mechanically secured to a second coupling element, the body defining a lumen having proximal and distal ends of a first diameter, the lumen including a middle section having a second diameter larger than the first diameter and frustoconical portions that transition from the middle section to the proximal and distal ends;
    a collet disposed in the lumen and configured to receive a portion of the optical fiber, the collet including tapered ends that are urged against the frustoconical portions of the lumen when the first and second coupling elements are secured together such that the tapered ends of the collet are clamped against the optical fiber to hold the optical fiber in place with respect to the first and second coupling elements;
    an adjustable ferrule threadedly secured to a proximal end of the body; and
    a connector element secured to the proximal end of the body with the adjustable ferrule, wherein the connector element is rotatable with respect to the body to mechanically secure the connector to the optical system.

10. The connector of claim 9, wherein the connector element defines a threaded annular cavity, and wherein the connector further comprises:
a cap including an outer thread that is securable to the threaded annular cavity to cover the adjustable ferrule.

11. The connector of claim 9, and further comprising:
a first set screw receivable in a radially directed threaded bore extending through the first coupling element and engageable with the second coupling element to lock the second coupling element longitudinally with respect to the first coupling element; and
a second set screw receivable in a radially directed threaded bore extending through the second coupling element and engageable with the adjustable ferrule to lock the adjustable ferrule longitudinally with respect to the second coupling element.

12. The connector of claim 9, wherein the adjustable ferrule includes a central lumen having a cylindrical recess that supports a sealing layer.

13. The connector of claim 9, and further comprising:
a collar disposed around the first coupling element and second coupling element, the collar secured to the connector element and spaced from the first and second coupling elements such that rotation of the collar rotates the connector element with respect to the second coupling element.

14. An optical fiber assembly comprising:
an optical fiber;
a first coupling element including a proximal end and a distal end;
a second coupling element including a proximal end and a distal end, the distal end of the second coupling element threadedly secured to the proximal end of the first coupling element, wherein the first coupling element and second coupling element define a lumen;
a collet that receives a buffered portion of the optical fiber, the collet disposed in the lumen such that the collet holds the optical fiber in place with respect to the first and second coupling elements;
an adjustable ferrule, threadedly secured to the proximal end of the second coupling element, that receives an unbuffered and/or buffered portion of the optical fiber, wherein the adjustable ferrule is rotatable with respect to the second coupling element to translate a proximal end of the adjustable ferrule longitudinally with respect to a proximal end of the optical fiber; and
a connector element secured to the proximal end of the second coupling element with the adjustable ferrule, wherein the connector element is rotatable with respect to the second coupling element.

15. The optical fiber assembly of claim 14, wherein the connector element defines a threaded annular cavity, and wherein the connector further comprises:
a cap including an outer thread that is securable to the threaded annular cavity to cover the adjustable ferrule.

16. The optical fiber assembly of claim 14, and further comprising:
a collar disposed around the first coupling element and second coupling element, the collar secured to the connector element and spaced from the first and second coupling elements such that rotation of the collar rotates the connector element with respect to the second coupling element.

17. The optical fiber assembly of claim 14, wherein the collet includes tapered ends, wherein the lumen is sized such that the tapered ends of the collet are urged against ends of lumen, and wherein the ends of the lumen are shaped such that the tapered ends of the collet are clamped against the optical fiber to hold the optical fiber in place with respect to the first and second coupling elements.

18. The optical fiber assembly of claim 14, and further comprising:
a first set screw receivable in a radially directed threaded bore extending through the first coupling element and engageable with the second coupling element to lock the second coupling element longitudinally with respect to the first coupling element; and
a second set screw receivable in a radially directed threaded bore extending through the second coupling element and engageable with the adjustable ferrule to lock the adjustable ferrule longitudinally with respect to the second coupling element.

19. The optical fiber assembly of claim 14, wherein the adjustable ferrule includes a central lumen having a cylindrical recess that supports a sealing layer.

20. The optical fiber assembly of claim 14, wherein the connector element comprises a threaded coupling nut.

* * * * *